(12) United States Patent
Wood Bradley et al.

(10) Patent No.: US 10,977,621 B2
(45) Date of Patent: *Apr. 13, 2021

(54) ACTION-BASED TO-DO LIST

(71) Applicant: INTERNATIONAL BUSINESS MACHINES CORPORATION, Armonk, NY (US)

(72) Inventors: Lisa M. Wood Bradley, Cary, NC (US); Timothy Brantner, Durham, NC (US); Jason M. Brown, Wake, NC (US); Helen L. Gawor, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 15/639,417

(22) Filed: Jun. 30, 2017

(65) Prior Publication Data

US 2017/0300870 A1    Oct. 19, 2017

Related U.S. Application Data

(63) Continuation of application No. 12/492,941, filed on Jun. 26, 2009, now Pat. No. 9,754,224.

(51) Int. Cl.
*G06Q 10/10* (2012.01)
*G06Q 10/06* (2012.01)
(Continued)

(52) U.S. Cl.
CPC ......... *G06Q 10/1097* (2013.01); *G06Q 10/06* (2013.01); *G06Q 10/06316* (2013.01); *G06F 3/0482* (2013.01); *G06F 16/168* (2019.01)

(58) Field of Classification Search
CPC .................................................... G06Q 10/10
See application file for complete search history.

(56) References Cited

U.S. PATENT DOCUMENTS

| 5,787,373 A | 7/1998 | Migues et al. |
| 5,835,758 A | 11/1998 | Nochur et al. |

(Continued)

OTHER PUBLICATIONS

Kwon, O.; Choi, Sungchul.; Park, Gyuro. "NAMA: A context-Aware Multi-Agent Based Web Service Approach to Proactive Need Identification for Personalized Reminder Systems". 2005 Expert Systems with Applications. vol. 25. pp. 17-32.

(Continued)

*Primary Examiner* — Kurtis Gills
(74) *Attorney, Agent, or Firm* — Fabian VanCott; Steven L. Nichols

(57) ABSTRACT

A method for implementing an action-based to-do list includes monitoring user actions with a personal management device which is configured to compare the user actions to a task definition file. A processor of the personal management device determines if the user actions fulfill one or more predefined conditions, within the task definition file. If a condition is fulfilled, the processor of the personal management device modifies the to-do list based on the fulfilled condition. A personal management device for implementing an action-based to-do list includes a user interface configured to allow a user to interact with a to-do list application and a processor configured to execute the to-do list application. The to-do list application, when executed, causes the processor to monitor user actions and compare the user actions to a task definition file, determine if the user actions fulfill one or more conditions within the task definition file, and if a condition is fulfilled, modify the to-do list based on the fulfilled condition.

20 Claims, 12 Drawing Sheets

(51) Int. Cl.
*G06F 16/16* (2019.01)
*G06F 3/0482* (2013.01)

(56) References Cited

U.S. PATENT DOCUMENTS

| | | | |
|---|---|---|---|
| 5,848,271 | A | 12/1998 | Caruso et al. |
| 5,877,759 | A | 3/1999 | Bauer |
| 6,026,410 | A | 2/2000 | Alien et al. |
| 6,167,358 | A | 12/2000 | Othmer et al. |
| 6,177,905 | B1 | 1/2001 | Welch |
| 6,753,891 | B1 | 6/2004 | Chohan et al. |
| 6,829,564 | B2 | 12/2004 | Tanaka et al. |
| 6,954,737 | B2 | 10/2005 | Kalantar et al. |
| 7,027,996 | B2 | 4/2006 | Levinson |
| 7,089,287 | B2 | 8/2006 | Bellotti et al. |
| 7,149,741 | B2 | 12/2006 | Burkey et al. |
| 7,219,302 | B1 | 5/2007 | O'Shaughnessy et al. |
| 7,562,035 | B2 | 7/2009 | Fellenstein et al. |
| 8,108,436 | B2 | 1/2012 | Chhatrapati et al. |
| 2003/0120717 | A1 | 6/2003 | Callaway et al. |
| 2003/0158770 | A1 | 8/2003 | Carlson |
| 2004/0015867 | A1 | 1/2004 | Macko et al. |
| 2004/0054569 | A1 | 3/2004 | Pombo |
| 2004/0162750 | A1 | 8/2004 | Motoyama |
| 2004/0230685 | A1* | 11/2004 | Seligmann ............ G01C 21/00 709/228 |
| 2004/0244005 | A1 | 12/2004 | Ancier |
| 2004/0249776 | A1 | 12/2004 | Horvitz et al. |
| 2005/0125275 | A1 | 6/2005 | Wright et al. |
| 2005/0254775 | A1 | 11/2005 | Hamilton |
| 2006/0036478 | A1 | 2/2006 | Aleynikov |
| 2007/0088555 | A1 | 4/2007 | Layher |
| 2007/0100859 | A1 | 5/2007 | Holmes |
| 2007/0209010 | A1 | 9/2007 | West |
| 2007/0255594 | A1 | 11/2007 | Muehlmeier |
| 2008/0120616 | A1* | 5/2008 | James ...................... G06F 3/16 718/100 |
| 2008/0141247 | A1* | 6/2008 | Saravanan ........... G06Q 10/109 718/100 |
| 2008/0155547 | A1 | 6/2008 | Weber et al. |
| 2008/0163214 | A1 | 7/2008 | Rogers |
| 2009/0037362 | A1 | 2/2009 | Fox |
| 2009/0094623 | A1 | 4/2009 | Chakra |
| 2009/0222277 | A1 | 9/2009 | Malek |
| 2011/0320979 | A1 | 12/2011 | Rainisto |

OTHER PUBLICATIONS

McCarthy, Colleen E.; Pollack, Martha E.; "A Plan-Based Personalized Cognitive Orthotic". 2002 Sixth International Conference on AI Planning and Scheduling. 10 pages.

Landry, Brian M.; Nair, Rahul; Pousman, Zach; Tungare, Manas. "Taskminder: A Context-and User-Aware To-Do List Management System". Technical report, Georgia Institute of Technology (2003). 7 pages.

Masuoka, Ryusuke; Parsia, Bijan; Labrou, Yannis. "Task Computing—The Semantic Web Meets Pervasive Computing". 2003. Lecture Notes in Computer Science. vol. 2870/2003, pp. 866-881.

Schwerin, Michael J. et al.; "Usability Testing of the U.S. Navy Performance Management System: Technical Report #1". Sep. 9, 2004, RTI International. 126 pages.

* cited by examiner

ACTION-BASED TO-DO LIST

BACKGROUND

In managing tasks which occur in their day-to-day schedules, people often use to-do lists. To-do lists describe the various tasks that the individual or group needs to accomplish. These to-do lists may take a variety of forms, including paper and electronic lists. While such lists help prevent the user from forgetting a task that needs to be performed, in many instances, managing a to-do list can be time consuming and disruptive. The user has to take the time to both add tasks to the list as they come up and to remove or update tasks on the list as they are fully or partially completed.

BRIEF SUMMARY

A method for implementing an action-based to-do list includes monitoring user actions with a personal management device which is configured to compare the user actions to a task definition file. A processor of the personal management device determines if the user actions fulfill one or more predefined conditions, within the task definition file. If a condition is fulfilled, the processor of the personal management device modifies the to-do list based on the fulfilled condition. A personal management device for implementing an action-based to-do list includes a user interface configured to allow a user to interact with a to-do list application and a processor configured to execute the to-do list application. The to-do list application, when executed, causes the processor to monitor user actions and compare the user actions to a task definition file, determine if the user actions fulfill one or more conditions within the task definition file, and if a condition is fulfilled, modify the to-do list based on the fulfilled condition.

A personal management device for implementing an action-based to-do list includes a user interface for interfacing a user with a to-do list application and a processor configured to execute the to-do list application. The to-do list application, when executed, causes the processor to monitor user actions and compare the user actions to a task definition file, determine if the user actions fulfill a condition within the task definition file and modify the to-do list based on the fulfilled condition.

A computer program product for implementing an action-based to-do list includes a computer readable storage medium having computer readable program code configured to monitor user actions and compare the user actions to a task definition file. If it is determined that the user actions fulfill one or more conditions within the task definition file, the computer usable program code modifies the to-do list based on the fulfilled condition.

BRIEF DESCRIPTION OF THE SEVERAL VIEWS OF THE DRAWINGS

The accompanying drawings illustrate various embodiments of the principles described herein and are a part of the specification. The illustrated embodiments am merely examples and do not limit the scope of the claims.

Throughout the drawings, identical reference numbers designate similar, but not necessarily identical, elements.

DETAILED DESCRIPTION

Figure 1:
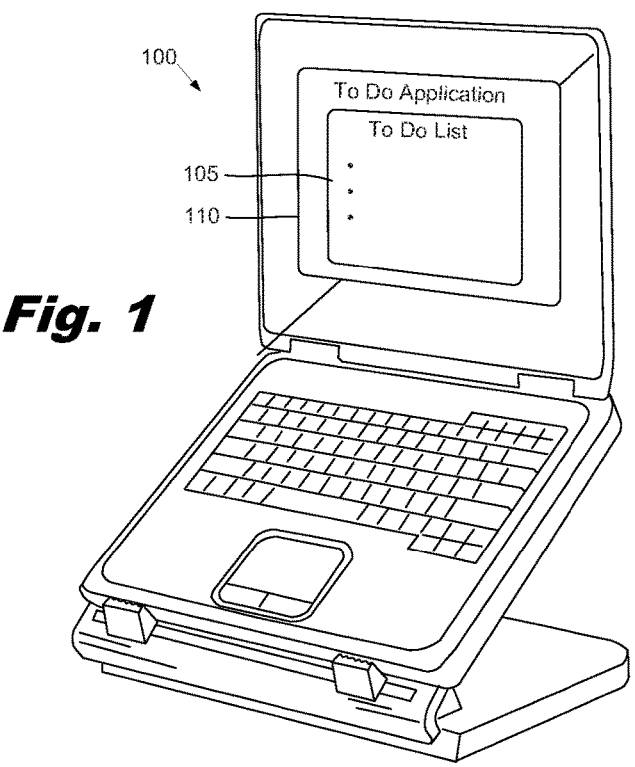
FIG. 1 is a perspective view of a personal management device operating an illustrative to-do application and displaying an illustrative to-do list, according to one embodiment of principles described herein.

On a typical day users often get interrupted and distracted from a task they are trying to complete. They start off doing one thing, then realize they have to do another task, and then another. In some such cases, the user may forget tasks begun earlier in the day. For this and many other reasons, as described above, people often use to-do lists for managing tasks which occur in their day-to-day schedules. These to-do lists describe the various tasks that the individual or group needs to accomplish. These to-do lists may take a variety of forms, including electronic and paper lists. Typically, a user manually enters or indicates a task which is to be included on the to-do list. Additionally, with these lists there is no way to keep track of task completion except for the user manually indicating that they have fully or partially completed the task.

This specification describes systems and methods of managing a to-do list that monitor the actions of a user and interpret these actions with respect to the items on a to-do list so as to help create and manage the to-do list. In this way, the user does not always have to manually add items to their to-do list, and the user does not always need to mark items complete when they are done because the system will keep track of actions that constitute completion of at least some of the to-do tasks. The system recognizes the actions of the user and how they relate to the to-do list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Many people employ a to-do list in order to remember tasks that need to be completed, to prioritize those tasks and to perform the listed tasks more efficiently. Without such management, people often get interrupted and distracted from a task they are trying to complete.

Figure 2:
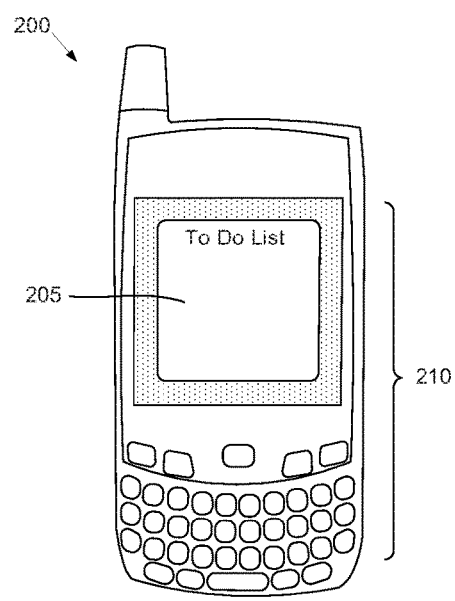
FIG. 2 is a front view of a personal management device displaying an illustrative to-do list, according to one embodiment of principles described herein.

An action-based to-do list may be operated and displayed from a variety of platforms. For example, FIG. 1 is a perspective view of a personal management device which is supporting a to-do application (110) and displaying an illustrative to-do list (105). FIG. 2 is a front view of another personal management device (200) displaying an illustrative to-do list (205). A variety of personal management devices may display or manage an action-based to-do list. As used herein and in the appended claims, the term personal management device will be defined as referring to any electronic device configured to manage a to-do list for a user, including but not limited to, computers, laptops, cell phones, smart phones, personal digital assistants, servers, workstations, digital electronic systems, home electronics, and other electronic devices. According to one illustrative embodiment, the personal management device (200) includes a user interface (210) which allows a user to interact with the to-do application or to-do list. For example, a personal management device (200) may include a keyboard, screen, mouse, touch pad, touch sensitive screen, or other input/output devices which act as an interface through which the user can interact with the to-do application.

The action-based to-do list assists a user in remembering and accomplishing a variety of tasks. According to one illustrative embodiment, the personal management device contains a computer storage unit which stores a task definition file. The task definition file contains a number of criteria which can be tracked and used to automatically manipulate the to-do list. The processor of the personal management device monitors the user's actions and compares the user's actions to the criteria within the task definition file to determine if one or more of the criteria have been fulfilled. If a criterion has been met, the processor of the personal management device then modifies the to-do list based on the fulfilled criteria.

Figure 3:
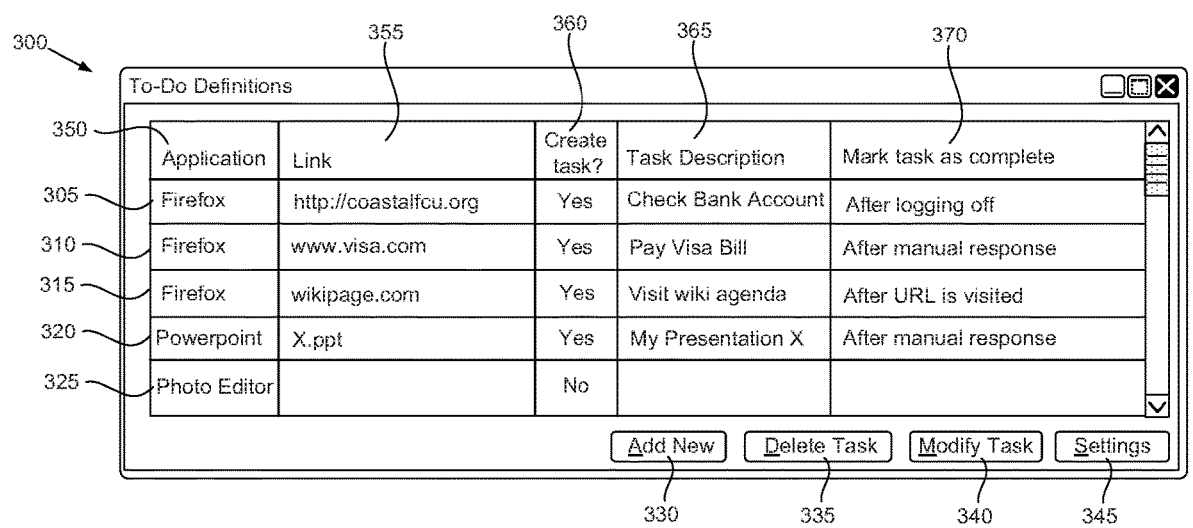
FIG. 3 is a diagram of an illustrative task definition file, according to one illustrative embodiment of principles described herein.

FIG. 3 is a diagram of an illustrative screen shot of a to-do task definition file (300). According to one illustrative embodiment, the to-do task definitions (305-325) contain a number of criteria which describe the task, the environment in which the task is performed and other information. As described above, the to-do application (110, FIG. 1) monitors and compares user actions to criteria contained in the task definition file (300), then takes appropriate action. For example, a first task (305) may be to check a bank account to ensure that funds are available to pay a Visa bill. The information included in the task definitions may include the application (350) which is used to perform the task, a link (355) to the location associated with the task, the task description (365), and other information. For example, the first task (305) uses an Internet browser which is directed to a web address or Universal Resource Locator (URL) corresponding to the user's bank or credit unit, e.t.c, "http://costalfcu.org.". The task description "Check Bank Account" is used to give the user information about the task to be completed. The link or access location may vary according to the task and application. For example, the access location for a web browser may be an internet address, an intranet location, a file path, or other identifier.

The rightmost column (370) is labeled "Mark task as complete." This column describes the condition or conditions which trigger the to-do application to mark a task as complete. These conditions may be automatic or manual. For example, the task "Check Bank Account" (305) is automatically marked as complete after the user accesses and then logs off of the website for the bank. Another automatic condition for marking the task as complete could be "After URL is visited." Manual conditions for marking a task as complete may include the user affirmatively taking an action, such as clicking a button on a pop up window before the task is marked as complete.

Other tasks include "Pay Visa Bill," (310) which is marked as complete after a manual response from the user. The next task, "Visit wiki agenda," (315) is marked as automatically marked as complete after the user visits the "wikipage.com" URL. A fourth task "My Presentation X" (320) is related to a file, "X.ppt," which is internal to the user's computer system and is linked based on file path and/or a file name. This task is marked as complete after a manual response by the user.

According to one illustrative embodiment, the to-do task definition file (300) may also include negative definitions. The definition (325) labeled "Photo Editor" is a negative definition which states that an application named "Photo Editor" is not to be associated with or generate any task on the to-do list. By using negative definitions, the user can tailor the performance of the to-do application to avoid unnecessary or undesirable generation of to-do tasks. For example, as a hobby the user may take digital photos of their children or vacations. There is no urgency associated with editing these photos and the user may not wish use the to-do application to create or track tasks associated with the photo editing application.

A number of additional options could be presented to the user. For example, buttons (330, 335, 340, 345) may be selected by the user to perform various modifications of the to-do task list. A first button (330) allows the user to manually add a new task. A second button (335) allows the user to delete a selected task. The modify task button (340) may present an additional window which allows the user to review or specify more characteristics of a selected task. The settings button (345) may present an additional window which allows the user to review or specify the overall settings for the to-do application.

In some illustrative embodiments, a pre-configured task definition file could be provided with the to-do application or by an organization such as the user's employer. This pre-configured task definition file could contain commonly used definitions of to-do tasks. This could reduce the amount of effort which the user needs to personalize the to-do application and to-do definition file (300).

Figure 4:
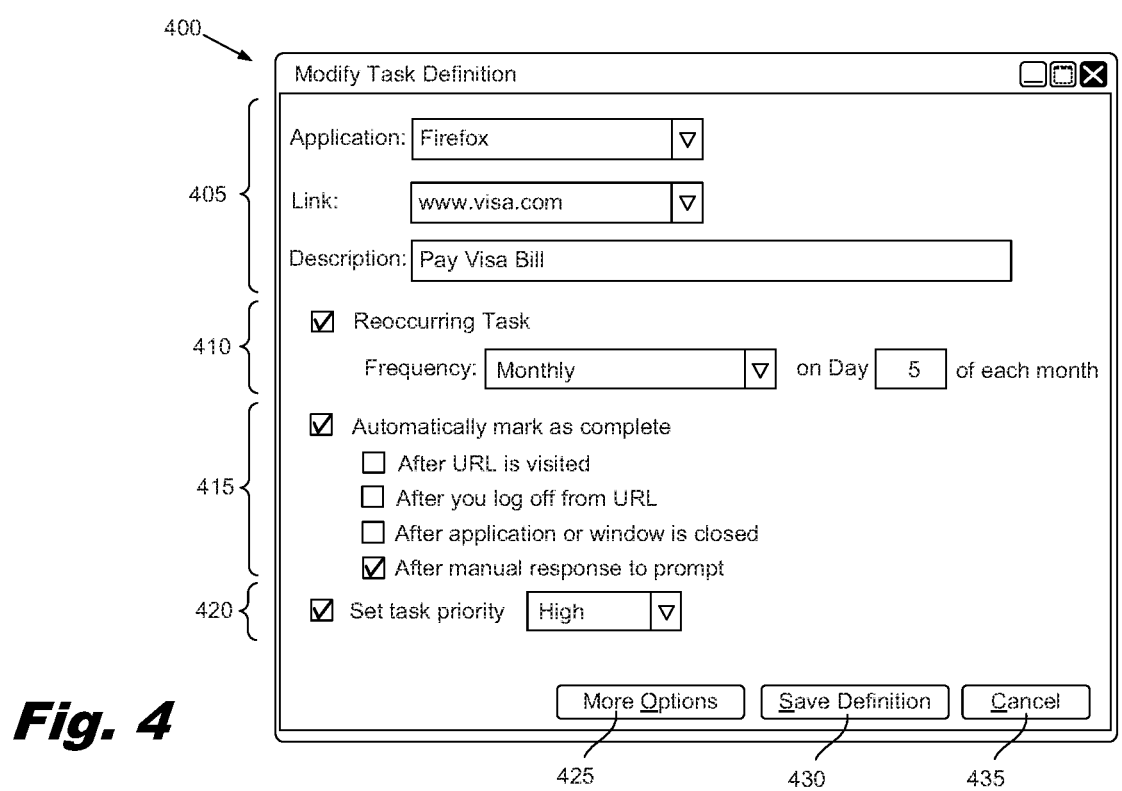
FIG. 4 is a diagram of an illustrative modify task definition window, according to one embodiment of principles described herein.

FIG. 4 is a diagram of an illustrative modify task definition window (400) which can be accessed in a variety of ways, including selecting the modify task button (340) shown in FIG. 3. FIG. 4 illustrates illustrative task definition criteria for the task "Pay Visa Bill" (310, FIG. 3). According to one illustrative embodiment, the modify task definition window (400) allows the user to review or specify more characteristics of a selected task. By way of example and not limitation, these characteristics may include information identifying the task (405), the re-occurrence of the task (410), the criteria for marking the task as complete (415) and the task priority (420).

In FIG. 4, the illustrated task of "Paying Visa Bill" is identified by information (405) in the first three fields. A second group of fields (410) specifies that the task "Pay Visa Bill" is set to reoccur on the fifth day of each month. A third group of fields (415) provide options which the user can select to indicate completion of a task. In this case, the task is marked as complete after an affirmative response by the user to a prompt generated by the to-do application. The priority of the task is set to high in a fourth group of fields (420). As discussed above, the task definition is available for review and modification by the user. The user can select one or more of the available options to change the definition of a given task and the performance of the to-do application. For example, if the user feels that the task is of lesser importance, the user may select a lower task priority. If the user prefers more automated actions, the user may select one of the options for completion which do not require the user to manually respond to a prompt.

A variety of other features may be available for selection by the user. By way of example and not limitation, these buttons may include a "More Options" button (425), a "Save Definitions" button (430) and a "Cancel" button (435). These buttons (425, 430, 435) are only illustrative examples of features which could be provided in the window.

Figure 5:
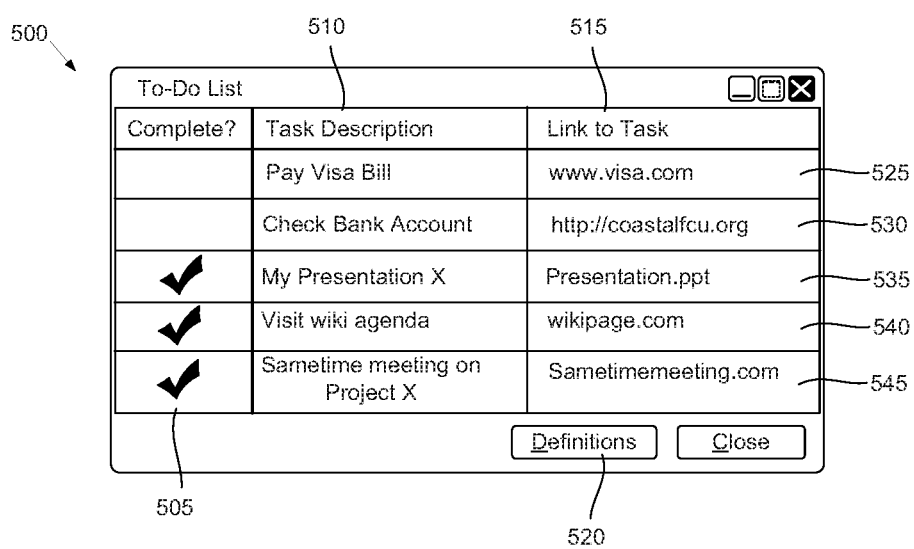
FIG. 5 is a diagram of an illustrative to-do list, according to one embodiment of principles described herein.

FIG. 5 is a diagram of an illustrative action-based to-do list (500). According to one illustrative embodiment, the to-do list (500) includes a column (505) for visually indicating the completion status of the tasks, a task description column (510), and a "Link to Task" column (515). A number of other control features (520) may give access to additional information and allow the user to control the function and management of the to-do list (500). The to-do list (500) shown in FIG. 5 is only one illustrative embodiment of a to-do list. A variety of additional or alternative information and features may be displayed on the action-based to-do list. For example, if a task has a specific deadline, the deadline may also be displayed. Additionally, the organization or display of the tasks may reflect the importance and/or priority for accomplishing the tasks.

The following scenario describes possible events which lead to the creation and modification of the action-based to-do list (500) shown in FIG. 5. The personal management device (100, 200; FIG. 1) operates a to-do application (110, FIG. 1) that monitors the user's actions, calendar and other events. The to-do application (110, FIG. 1) compares these inputs to the task definition file (300, FIG. 3) to create and maintain an action-based to-do list (500). The following scenario illustrates the creation of the action-based to-do list (500) from the task definition file (300, FIG. 3). In this illustrative scenario, the date is after the 5$^{th}$ of the month and the to-do application (110, FIG. 1) has automatically created the "Pay Visa Bill" task (525) and placed it in the user's to-do list (500). This task reminds the user to pay their Visa bill and monitors the user's actions to determine if that task is complete. The user is working on a computer and decides to check something in a personal bank account. The user then launches an Internet browser and goes to the bank's website, "http://coastalfcu.org". The to-do application monitors this action as well and determines that opening this website meets the criteria to check off a second to-do task "Check Bank Account" (530).

According to one illustrative embodiment, the to-do application interfaces with and monitors the user's electronic calendar application and has automatically generated several entries (535, 540, 545) which related to a morning meeting on project X which is listed on the calendar. These tasks include review of a presentation X (535) for the meeting, visiting a wiki agenda for the meeting (540), and actually holding the meeting on project X (545). The user glances at the to-do list (500) and realizes that the meeting on project X is coming up. According to one illustrative embodiment, the tasks may be presented in order of priority, desired sequential performance, or other criteria.

In this embodiment, the three tasks (535, 540, 545) related to the meeting on project X are shown in order of desired sequential performance. The personal management device (100, 200; FIG. 1) has determined by consulting criteria in the task definition file, that the presentation X should first be reviewed (535), the wiki agenda (540) should be visited, and then the meeting on project X (545) should be attended. Consequently, the presentation X task (535) is shown first, the visit wiki agenda task is shown second (540) and the meeting on project X is shown last (545). This allows the user to easily perform the tasks in the logical order.

The user opens the presentation, reviews it, and then closes the application. The to-do application monitors this action and, according to the manual completion criteria for this task (320, FIG. 3) in the task definition file (300, FIG. 3), presents the user with a prompt or pop-up window which asks if the user has completed this task. The user manually selects "Yes" and the task (535) is marked as complete on the to-do list (500). The user consults the to-do list (500) to determine the next task in preparing for the meeting, and then opens the wiki agenda URL "wikipage.com." This fulfills the criteria for the completion of this task and the to-do application automatically marks it as complete. The user is then goes to the URL "sametimemeeting.com" and holds the meeting. This fulfills the criteria for the completion of this task (545), which is automatically marked as being complete by the to-do application.

At this point, the user has completed several tasks which are marked as complete on the to-do list (500). However, the user has not yet completed the tasks "Pay Visa Bill" (525) and "Check Bank Account" (530). These tasks are displayed at the top of the to-do list and will remind the user of the tasks which were scheduled or started, but were not completed.

Figure 6:
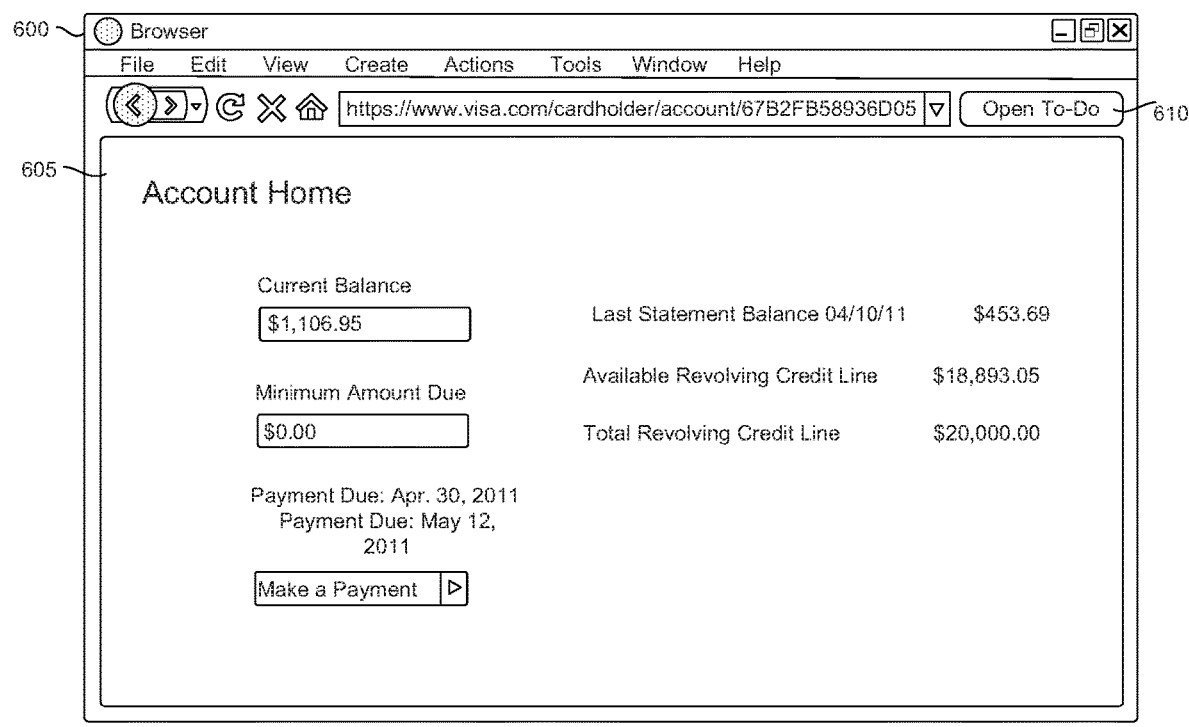
FIG. 6 is a diagram of an illustrative application with a button for accessing a to-do application, according to one embodiment of principles described herein.

The following figures and description follow the "Pay Visa Bill" task through its initial creation through to its completion. There are a variety of ways that entries into the task definition file can be made or a new to-do task can be created. FIG. 6 shows one illustrative way that the second entry "pay visa bill" (310; FIG. 3) in the to-do definition file (300) could have been initially created. According to one illustrative embodiment, an external application may have a button for creating a to-do task. As used herein and in the appended claims, the term "external application" refers to any application other than the to-do list application itself. As explained herein, external applications may contribute items to the to-do list managed by the to-do list application.

In this figure, the external application (600) is a browser which the user has used to log into a secure website (605) to view and pay their credit card balance. The browser (600) includes an "Open To-Do" button (610) which may provide a number of options related to creating, monitoring, or modifying a to-do task related to the current webpage or user actions. For example, button (610) may be used to create a new task to be included on the to-do list, modify an existing task, create a new definition item, or modify an existing definition item. For example, button (610) could be used to modify a to-do task or definition which was automatically created when the user opened a window.

Figure 7:
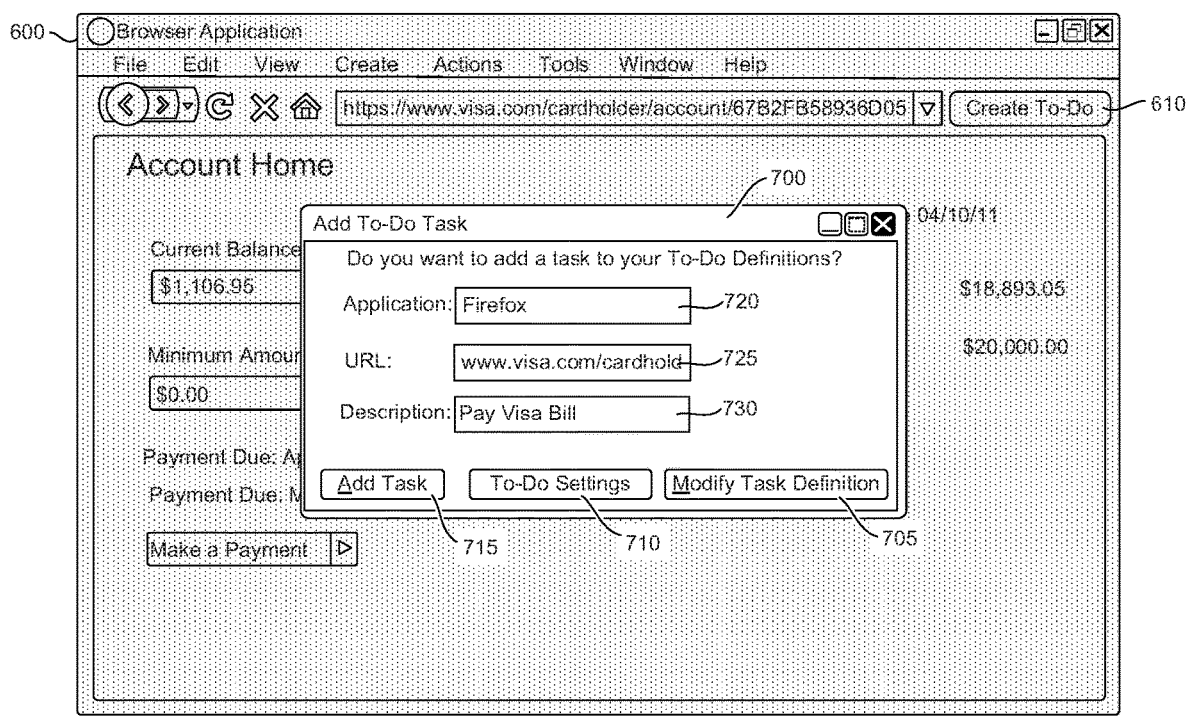
FIG. 7 is a diagram of an illustrative pop-up window for creating a task definition, according to one embodiment of principles described herein.

FIG. 7 is a diagram of an illustrative pop-up window (700) which can be displayed over a browser (600). The pop-up window (700) can be triggered by a variety of actions including selecting a button (610) or closing a window. According to one illustrative embodiment, the pop-up window (700) can be used to add a task to the to-do list or add a new entry to the definition file. The pop-up window (700) may contain a number of fields and options for defining the task or an entry in the definition file. For example, the pop-up window (700) may contain an application field (720), an identification field (725) and a description field (730). According to one illustrative embodiment, the to-do application may automatically fill one or more of the fields in the pop-up window. These automatically populated data fields may include the URL or other data locator where the task is to be performed, login information, the method used to verify completion of the task, the priority of the task, the reoccurrence of the task, a description of the task, the date of creation of the task, and other data fields. According to one illustrative embodiment, the user may view and edit these data fields to customize the performance of the action-based to-do list.

In the illustrative example shown in FIG. 7, the application is an Internet browser and the identification field is Uniform Resource Locator (URL) of the specific website where the task is performed. The description field (730) provides a textual description of the task and may be automatically or manually filled in. In some embodiments, the textual description may be contained within a definition file or automatically generated from a file name or other information. In this example, the descriptive text is "Pay Visa Bill."

A number of other options may be available to the user. By way of example and not limitation, these options may include an "Add Task" button (715), a "To-Do Settings" button (710), and a "Modify Task Definition" button (705). Each of these buttons may perform an associated action when selected by the user. For example, the "Add Task" button (715) may add the task defined above to the user's to-do list. The "To-Do Settings" button (710) may open a screen which allows the user to modify settings used by the to-do application. The "Modify Task Definition" button (705) may present a second screen to the user which allows the user to modify the items such as completion criteria, reoccurrence of the task, or other options. An illustrative modify task definition panel (400) is shown in FIG. 4.

The description above is only one illustrative example of a method for adding a task to a to-do list or modifying a definition within a definition file. Other examples include automated creation of a to-do task by an intelligent agent, selecting an icon on the user's desktop, directly modifying a displayed to-do list or task definition file, and many other options.

Figure 8:
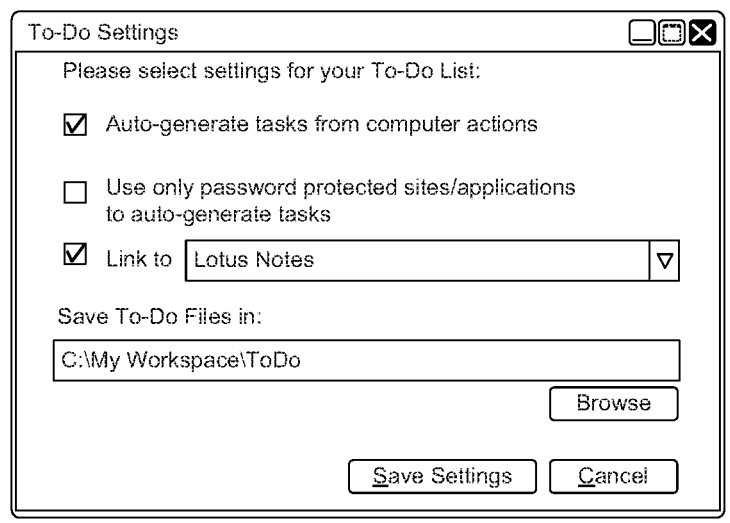
FIG. 8 is a screen shot of an illustrative settings window, according to one illustrative embodiment of principles described herein.

FIG. 8 is a screen shot of an illustrative to-do settings window (800) for a to-do application, which can be accessed in a variety of ways, including selecting the settings button (710) shown in FIG. 7. According to one illustrative embodiment, the settings window (800) provides control of the overall operation of the to-do application. A few illustrative settings are shown within the window (800). These include options for automatic generation of tasks from computer actions, using only password protected sites/applications to automatically generate tasks, and linking the to-do application to other applications. Automatic generation of tasks from computer actions can reduce the required user interaction to set up and use the to-do application. Tasks would be automatically generated base on the definition file and the user's action. By using only password protected sites/application, the scope of to-do tasks is focused on more important tasks which require some type of security measure. Linking the to-do application to other programs, such as calendaring or scheduling programs, can provide additional information to the to-do application and allow for tasks generated by the to-do application to be propagated to other applications and devices and vice versa. Additional fields and features can be provided in the to-do settings window, such as a location where files associated with the to-do application are to be stored.

Figure 9:
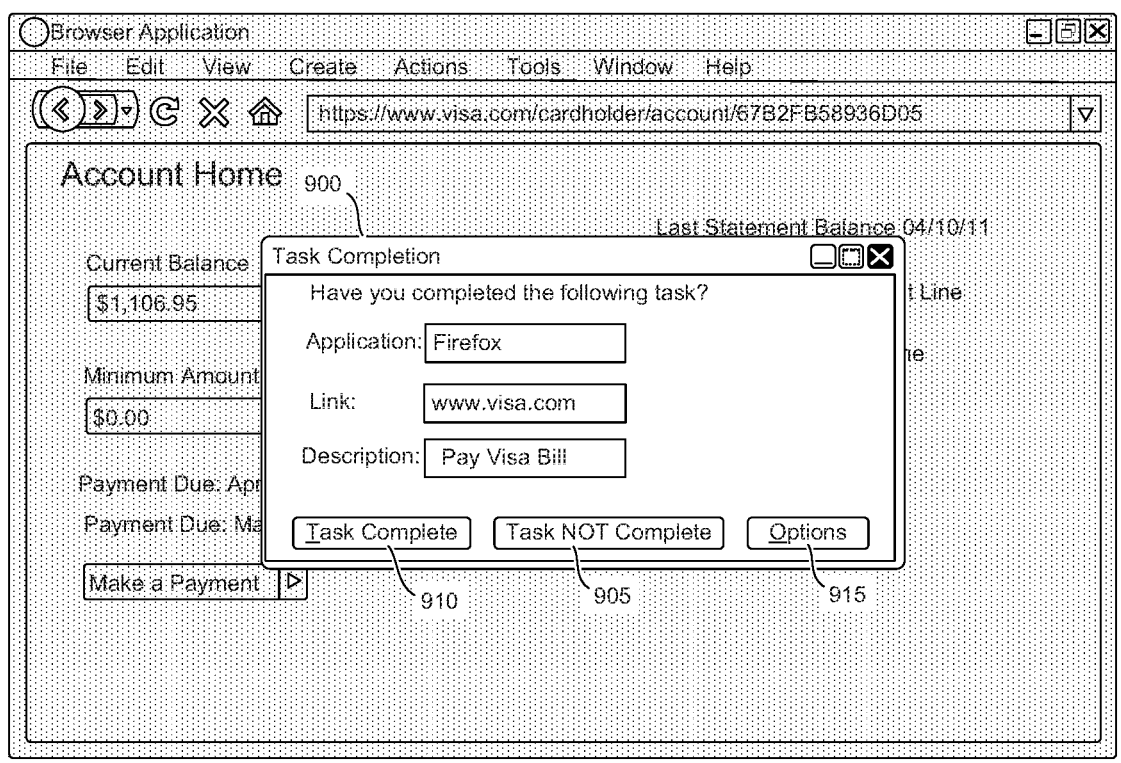
FIG. 9 is a screen shot of an illustrative task completion window, according to one illustrative embodiment of principles described herein.

FIG. 9 is a diagram of an illustrative screen shot of a task completion window (900). According to one illustrative embodiment, the task completion window appears after one or more specified actions by the user, such as closing a specific website or performing an action within the website. The task completion window (900) provides information which identifies the task and asks the user if the task has been completed. The user then selects a button which informs the to-do application of the status of the task. For example, a task complete button (910) may be selected to inform the to-do application that the task has been complete and should be marked as complete or removed from the to-do list.

If the task is not complete, the user may press the "Task NOT Complete" button (905). This indicates to the to-do application that the user has not completed the task and that it should remain on the to-do list. The options button (915) may provide access to other desirable features or information related to the task or the to-do application.

According to one illustrative embodiment, a task may be marked as complete in a variety of ways. For example, the task may be automatically marked as complete when a criteria within the definition file is met. Additionally or alternatively, the to-do application can generate a prompt which provided an opportunity for the user to mark a task as complete. In one illustrative embodiment, the user may directly access the to-do list and mark tasks complete as desired.

In FIG. 9, the user has accessed the www.visa.com website and has completed the task of paying their visa bill. Consequently, the user presses the "Task Complete" button (910) and the task is marked as complete on the to-do list.

Figure 10:
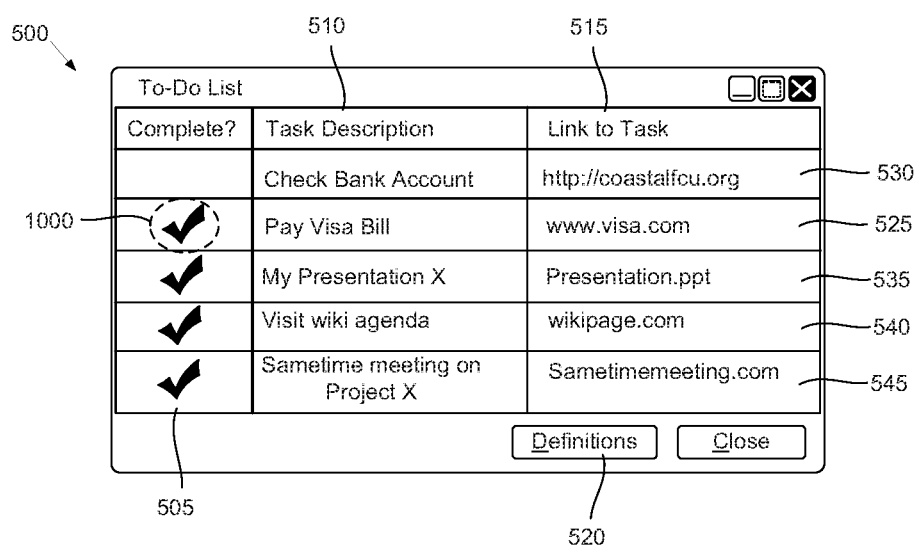
FIG. 10 is a diagram of an illustrative to-do list, according to one embodiment of principles described herein.

FIG. 10 is a diagram of an illustrative to-do list (300) with the "Pay Visa Bill" task (525) marked as complete. According to one illustrative embodiment, this is visually indicated by placing a check mark (1000) in front of the task. According to one illustrative embodiment, the remaining incomplete tasks may be reorganized following the completion of a task. The incomplete tasks could be arranged in a variety of ways. For example, the incomplete tasks could be arranged according to priority, with the tasks which have the highest priority being listed first and tasks with lower priority being listed beneath higher priority tasks.

Additionally or alternatively, the tasks could be ordered such that the tasks could be accomplished most efficiently. For example, two interrelated tasks may be listed together. For example, it may be most efficient for the user to perform the task "Check Bank Account" prior to performing the task "Pay Visa Bill" to ensure that adequate funds are available in the bank account for the payment of the Visa bill. In another example, two tasks may be performed with the same application and at the same location. For example, the user may have a task which reminds him to download new pictures from his camera onto his blog site. A related task may be labeling the pictures and writing brief descriptions of the pictures. By listing interrelated tasks together and in a logical order, the to-do list can assist the user in efficiently accomplishing the tasks.

Figure 11:
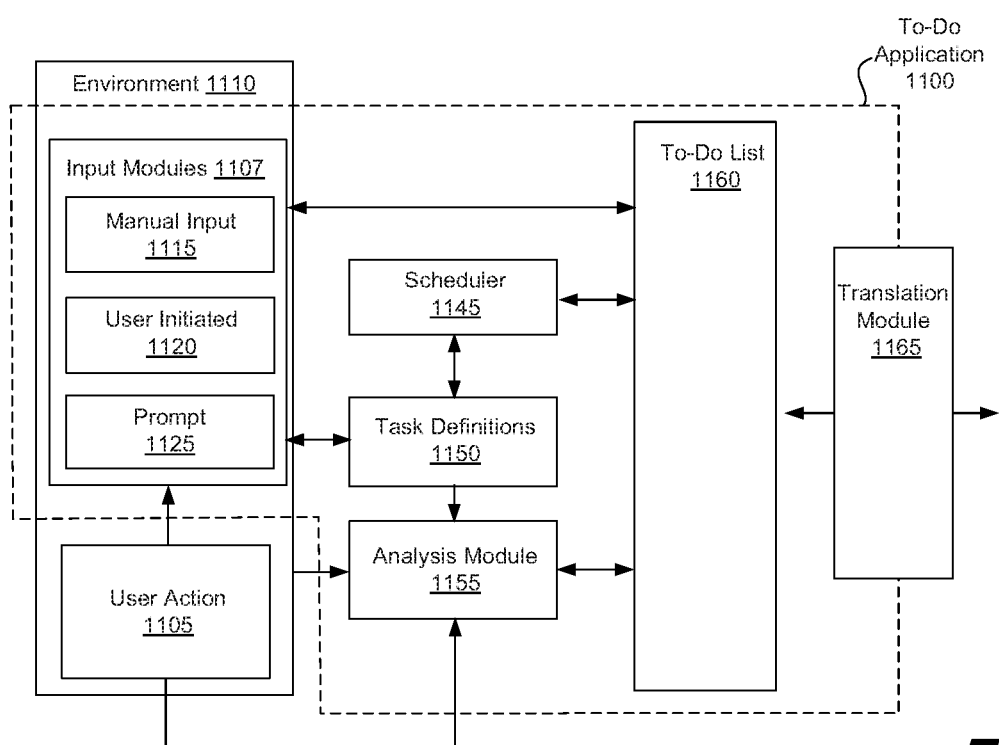
FIG. 11 is a block diagram of an illustrative system for action-based task management, according to one illustrative embodiment of principles described herein.

FIG. 11 is a block diagram of an illustrative system for action-based task management. According to one illustrative embodiment, user actions (1105) take place in an environment (1110). The environment (1110) may be a computer environment or a combination of other environments, such as work, social, or natural environments. The to-do application (1100) senses user action within the environment and allows for user input through a number of input modules (1107). The to-do application (1100) may sense user action in a variety of ways including, but not limited to, monitoring computer applications, keystroke logging, camera data, voice data, or other techniques.

Input modules (1107) provide the opportunity for the user to provide feedback or other information to the to-do application (1100). In one embodiment, the input modules (1107) may include a manual input module (1115) that provides the user with an opportunity to manually configure various tasks, task definitions, settings, or the to-do list itself. The user initiated module (1120) may also be used. For example, the "Open To-Do" button (610) illustrated in FIG. 6 is one method for a user to initiate a task or modification of a task definition file. A prompt module (1125) may automatically display various windows or features to request user feedback. For example, the task completion window (900) in FIG. 9 queries the user to determine if a task has been completed.

After sensing user actions (1105) or other parameters within the environment (1110), several actions can be taken within the to-do application (1100). For example, the to-do list (1160) may be directly modified or the task definitions (1150) may be modified. A scheduler (1145) can be used to monitor the to-do list and task definitions for time sensitive tasks. The analysis module (1155) may access the task definitions and to-do list to determine which tasks are active and their associated completion criteria. The analysis module (1155) can be used to detect user actions or conditions which indicate the completion of a task. The analysis module (1125) can trigger various actions, such as prompting for user confirmation of the completion of a task. Additionally, the analysis module (1125) may remove or change the status of a task which has been completed. According to one illustrative embodiment, the analysis module (1125) may be an intelligent agent.

A translation module (1165) allows the to-do application (1100) to interact with other applications. The translation module (1165) may provide data formatting and open communication channels to various applications or computer services which are relevant to the to-do application. For example, the translation module (1165) may export or import data from a calendaring program. If a teleconference is scheduled on the calendaring program, the to-do application can apply a task definition to create various to-do tasks which prepare the user for the teleconference. For example, a task simply reminding the user to "prepare for teleconference" could be added to the list. Alternatively, the system may be programmed to note an upcoming teleconference and, in response, generate tasks such as sending out the teleconference access number to the participants and confirming participant attendance several days prior to the teleconference. Similarly, if the user creates a new to-do task within the to-do application (1100), the task could be passed through the translation module (1165) to the calendaring program to reserve time to accomplish the task.

Figure 12:
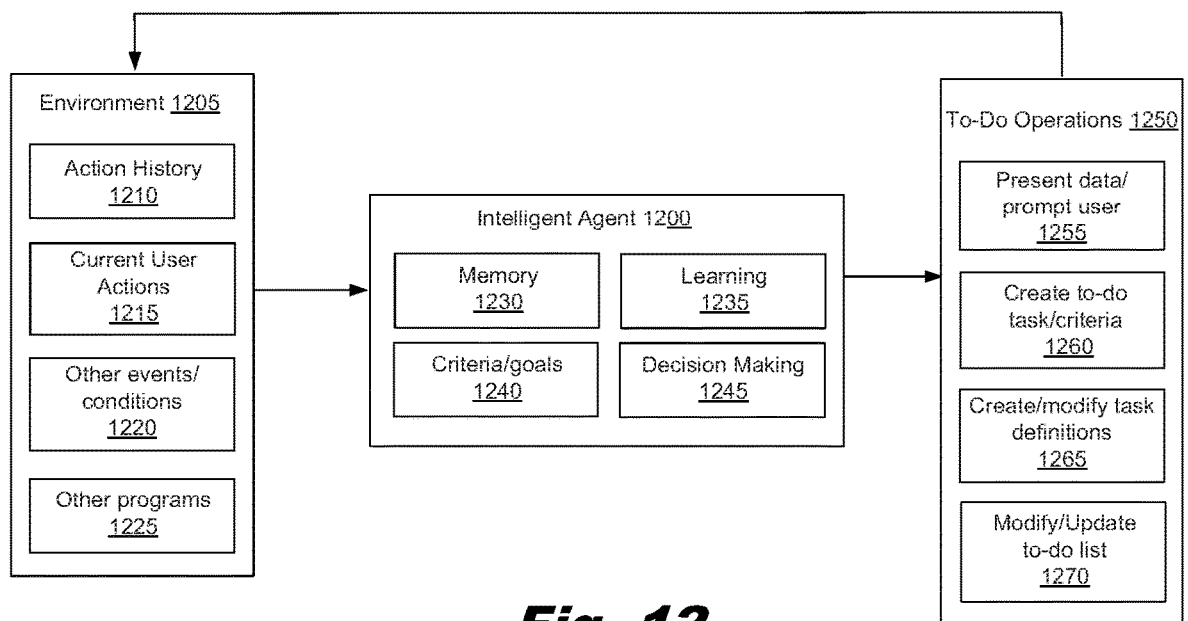
FIG. 12 is a diagram of an illustrative intelligent agent for performing to-do operations, according to one embodiment of principles described herein.

In some embodiments, an intelligent agent may be included within the analysis module (1155) to provide higher level functioning, such as learning and automated decision making. FIG. 12 is a diagram of an illustrative intelligent agent (1200) which analyzes an environment (1205) and executes various operations (1250) based on the characteristics of the environment (1205) and the user's actions within the environment (1205). According to one illustrative embodiment, the environment (1205) may contain a number of elements, such as an action history (1210), current user actions (1215), other events/conditions (1220), and other programs (1225). For example, the action history (1210) may be a record of at least a portion of the user's actions performed within the environment (1205). The current user actions (1215) are actions that the user is currently performing within the environment.

According to one illustrative embodiment, the intelligent agent (1200) is an autonomous or semi-autonomous entity which senses and acts upon the environment (1205). The intelligent agent (1200) may include a memory (1230), a criteria/goal module (1240), a learning module (1235), and a decision making module (1245). The memory module (1230) may retain information relating to the performance of the intelligent agent, the actions the intelligent agent has taken, and the environment the intelligent agent monitors. The criteria/goal module (1240) may contain and monitor various criteria and goal states. The learning module (1235) allows the intelligent agent (1200) to learn from past experience and improve its operation over time. The learning module (1235) may influence or reconfigure the other modules to improve effectiveness of the intelligent agent (1200). The decision making module (1245) evaluates the available information and chooses between various available operations to fulfill a particular criteria or bring the system closer to a goal state.

The intelligent agent (1200) then performs one or more operations (1250) which influence the monitored user environment (1205). For example, a first operation (1255) may include presenting data, options, or prompts to the user. A second operation (1260) may include creating a to-do task and placing it on the user's to-do list. A third operation may (1265) may include creating or modifying a task definition and saving the modification to a task definition file. Another operation (1270) may modify or update the to-do list. A variety of other actions may be performed which fulfill the criteria or goals (1240).

According to one illustrative example, the intelligent agent (1200) may analyze the action history (1210) and determine that the user consistently accesses a specific website to pay a credit card bill each month. The intelligent agent (1200) may have a criteria or goal of incorporating repetitive actions into a to-do task list. The intelligent agent (1200) then selects from a variety of operations which may help in incorporating the repetitive actions into the task list. For example, the intelligent agent (1200) may prompt the user to add the task the next time the user visits the website to pay the bill. The intelligent agent (1200) may have enough information to fill out many of the fields to define the task. For example, in addition to the application and identifying information, the intelligent agent (1200) may fill out fields which define the monthly reoccurrence of the task. By doing this, the intelligent agent (1200) reduces the user effort and time required to generate the task.

In some embodiments, the intelligent agent (1200) may take additional actions to assist the user in fulfilling the tasks. For example, the user may arrive at work on Monday morning and start his computer. As the to-do application is initializing, the intelligent agent (1200) checks the environment, including the to-do list and the date. The intelligent agent (1200) notices that the user has a reoccurring status web conference and needs to pay a Visa bill. According to one illustrative embodiment, the intelligent agent (1200) then opens the appropriate applications and directs them to the desired locations. For example, the intelligent agent (1200) could open the internet browser and direct it to the website for paying the Visa bill. Consequently, a user's computing environment is automatically configured by the autonomous agent (1200) to facilitate the tasks on the to-do list. This saves the user a significant amount of time, reduces distractions which are unrelated to the tasks, and reduces the likelihood that the user inadvertently forgets to fulfill a task.

Figure 13:
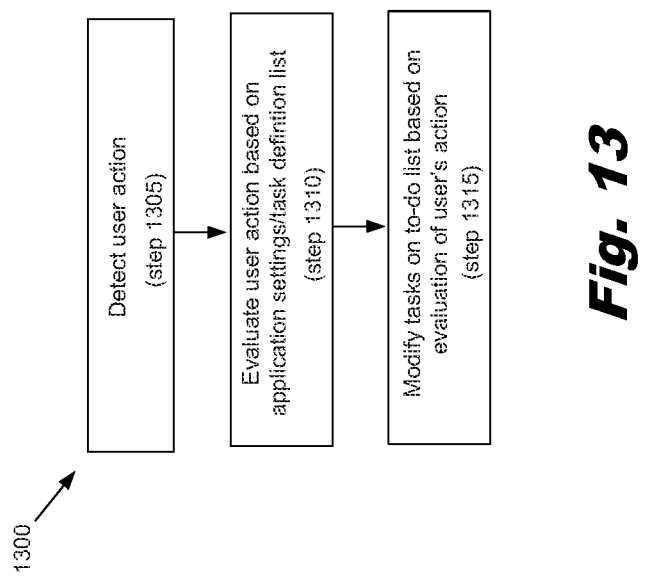
FIG. 13 is a flow chart of an illustrative method for action-based task management, according to one illustrative embodiment of principles described herein.

FIG. 13 is a flow chart of an illustrative method for action-based task management (1300). According to one illustrative embodiment, the method includes detecting user action (step 1305). The detection of user action can be performed in a variety of ways including directly monitoring user actions, referencing an action history, interfacing with other applications or devices, and other methods. The user action or actions are then evaluated based on various settings in the to-do application and/or definitions contained within the task definition list (step 1310). The evaluation may result in a variety of additional operations including modifying tasks on the to-do list (step 1315). For example, a task may be added, removed, or marked as complete on the do-to list.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for implementing an action-based to-do list, comprising:
    automatically configuring an external application within a user's computing environment to facilitate the user accomplishing a task;
    monitoring user actions with a personal management device to compare the user actions against a task definition file, which task definition file comprises a number of criteria which:
        indicate completion of at least one task; and
        are tracked and used to modify the action-based to do list;
    determining when the user actions fulfill a criteria within the task definition file; and
    automatically modifying the action-based to-do list with the personal management device based on fulfilled criteria.

2. The method of claim 1, wherein the task definition file, for a task of the action-based to-do list, indicates the environment in which the task is performed.

3. The method of claim 1, wherein the task definition file indicates, for a task of the action-based to-do list, an application which is used to perform the task.

4. The method of claim 1, wherein the task definition file includes, for a task of the action-based to-do list, a link to a location associated with the task.

5. The method of claim 1, further comprising presenting an interface to allow a user to create a task definition file.

6. The method of claim 1, further comprising displaying, for a task of the action-based to-do list, a deadline for the task.

7. The method of claim 1, further comprising:
    monitoring a user calendar; and
    generating a task in the task definition file based on monitoring of the user calendar.

8. The method of claim 1, further comprising generating a task in the action-based to-do-list based on the monitoring of user actions.

9. The method of claim 1, wherein tasks in the task definition file are organized in order of sequential performance.

10. The method of claim 1, further comprising generating a task in the task definition file by:
    presenting a pop-up window to add the task to the task definition file, the pop-up window comprising a number of fields for defining the task; and
    automatically filling in the number of fields to define the task.

11. The method of claim 1, further comprising allowing a user to indicate a recurrence of the task.

12. The method of claim 1, further comprising allowing a user to indicate a priority of the task.

13. A computer program product for implementing an action-based to-do list comprising:
    a non-transitory computer readable storage medium having computer readable program code disposed thereon, the computer readable program code comprising instructions to:
        access a task definition file listing an external application in which a to-do task on the action-based to-do list is to be performed, in which the task definition file comprises a number of criteria which:
            indicate completion of at least one to-do task; and
            are tracked and used to automatically manipulate the action-based to-do list;
        automatically configure the external application within the user's computing environment to facilitate the user accomplishing the to-do task;
        monitor, with a personal management device, user actions within the external application;
        compare, with the personal management device, the user actions within the external application to the number of criteria in the task definition file;
        determine when the user actions within the external application fulfill a criteria within the task definition file; and
        automatically modify the to-do list with the personal management device based on the fulfilled criteria.

14. The computer program product of claim 13, wherein the computer readable storage medium further comprises computer readable program code with instructions to prompt a user for manual indication of completion of a task.

15. A system for action-based task management, comprising:
    an electronic action-based to-do list comprising a list of tasks;
    a task definition file comprising a number of criteria which:
        indicate completion of at least one task; and
        are tracked and used to automatically manipulate the action-based to-do list;
    an analysis module to:
        automatically configure an external application within a user's computing environment to facilitate the user accomplishing a task;
        monitor user actions within a computing environment;
        compare user actions against the task definition file;

determine when the user actions fulfill a criteria within the task definition file; and automatically modify the action-based to-do list based on fulfilled criteria; and a translation module to import data from a separate application to facilitate automatic generation of tasks from computer actions in the separate application.

16. The system of claim 15, further comprising a scheduler to modify the action-based to-do list and task definition file for time sensitive tasks.

17. The system of claim 15, further comprising a learning module to learn from past experience and improve operation.

18. The system of claim 15, further comprising a decision making module to choose between various available operations to fulfill a criteria.

19. The system of claim 15, further comprising an intelligent agent to:
analyze an action history for repetitive user actions; and
generate a task based on the repetitive user actions.

20. The system of claim 15, further comprising an intelligent agent to open an external application in which a task is to be performed based on the task definition file.

* * * * *